(12) United States Patent
Fages

(10) Patent No.: US 10,746,322 B2
(45) Date of Patent: Aug. 18, 2020

(54) FLUID FLOW CONTROL VALVES

(71) Applicant: Ratier-Figeac SAS, Figeac (FR)

(72) Inventor: Christian Fages, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 183 days.

(21) Appl. No.: 15/964,236

(22) Filed: Apr. 27, 2018

(65) Prior Publication Data

US 2018/0313465 A1 Nov. 1, 2018

(30) Foreign Application Priority Data

Apr. 28, 2017 (EP) ..................................... 17305483

(51) Int. Cl.
| | |
|---|---|
| *F16K 47/14* | (2006.01) |
| *F16K 47/02* | (2006.01) |
| *F16K 31/528* | (2006.01) |
| *F16K 1/22* | (2006.01) |
| *F16K 47/04* | (2006.01) |

(52) U.S. Cl.
CPC ............. *F16K 47/14* (2013.01); *F16K 1/222* (2013.01); *F16K 31/5282* (2013.01); *F16K 47/02* (2013.01); *F16K 47/04* (2013.01)

(58) Field of Classification Search
CPC .......... F16K 47/02; F16K 47/08; F16K 47/14; F16K 1/222; Y10T 137/86734; Y10T 137/86743; Y10T 137/86751
USPC ............. 137/625.3, 625.31, 625.32; 251/305
See application file for complete search history.

(56) References Cited

U.S. PATENT DOCUMENTS

| | | | |
|---|---|---|---|
| 6,554,250 | B2 * | 4/2003 | Alves ........................ F16K 1/22 |
| | | | 123/337 |
| 8,826,938 | B2 | 9/2014 | Moore |
| 9,022,071 | B2 | 5/2015 | Venkitasubramony et al. |
| 9,528,632 | B2 | 12/2016 | Glaun |
| 9,556,970 | B2 | 1/2017 | Mastrovito |
| 2005/0199298 | A1 | 9/2005 | Farrington |

(Continued)

FOREIGN PATENT DOCUMENTS

| | | |
|---|---|---|
| EP | 0074782 A1 | 3/1983 |
| EP | 0101323 A2 | 2/1984 |
| FR | 2456271 A1 | 12/1980 |

(Continued)

OTHER PUBLICATIONS

Machine Translation of FR2456271, retrieved Dec. 18, 2019 (Year: 1980).*

(Continued)

*Primary Examiner* — Michael R Reid
(74) *Attorney, Agent, or Firm* — Cantor Colburn LLP

(57) ABSTRACT

A valve comprises a valve seat and a rotary valve element. The valve seat comprises a valve opening having a sealing surface. The valve element is mounted with respect to said valve seat for rotation about an axis of rotation between a closed position in which the valve element substantially closes the valve opening and an open position in which the valve element permits flow through the valve opening. The valve opening is elliptical in shape, having spaced apart upper and lower edges the upper and lower edges being generated as respective ellipses formed by parallel sections through a conical surface. The valve seat sealing surface is defined between said upper and lower edges.

14 Claims, 4 Drawing Sheets

(56) References Cited

U.S. PATENT DOCUMENTS

2016/0131165 A1    5/2016  Collins

FOREIGN PATENT DOCUMENTS

| GB | 1375300 A | * 11/1974 | ............ F16K 1/222 |
|----|-----------|-----------|----------|
| GB | 2516094 A | 1/2015 | |
| JP | H0632845 U | 4/1994 | |
| JP | 2003120829 A | 4/2003 | |
| JP | 2003329169 A | 11/2003 | |
| WO | 2011017407 A2 | 2/2011 | |
| WO | 2013084607 A1 | 6/2013 | |
| WO | 2017018173 A | 2/2017 | |

OTHER PUBLICATIONS

Machine Translation of JP2003329169, retrieved Dec. 18, 2019 (Year: 2003).*
Extended European Search Report for International Application No. 17305483.4 dated Oct. 20, 2017, 8 pages.

* cited by examiner

FLUID FLOW CONTROL VALVES

FOREIGN PRIORITY

This application claims priority to European Patent Application No. 17305483.4 filed Apr. 28, 2017, the entire contents of which is incorporated herein by reference.

TECHNICAL FIELD

The present disclosure relates to valves and in particular to fluid flow control valves.

BACKGROUND

Fluid flow control valves are well known. Typically a valve element is mounted in a valve opening provided in a valve housing and is rotatable between a closed position in which the valve element engages a valve seat provided around the valve opening and an open position in which the valve element disengages from the valve seat to allow fluid to flow through the valve opening.

Typically the valve element comprises a plate. However, with such a design, as the valve element rotates from the closed position to the open position, there is a rapid flow of fluid around the valve element and through the valve opening which may lead to a water hammer effect.

The present disclosure seeks to provide a valve construction which in certain embodiments at least may mitigate such effects.

SUMMARY

Disclosed herein is a valve having a valve seat comprising a valve opening and a sealing surface defined around the valve opening. A valve element is mounted with respect to said valve seat for rotation about an axis of rotation between a closed position in which the valve element substantially closes the valve opening and an open position in which the valve element permits flow through the valve opening. The valve opening is elliptical in shape, having spaced apart upper and lower edges which are generated as respective ellipses formed by parallel sections through a conical surface. The valve seat sealing surface is defined between the upper and lower edges. The valve element comprises a central sealing portion has a peripheral sealing surface which is complementary in shape to the sealing surface of the valve seat for engagement therewith in the closed position and first and second flow control portions extending in axially opposite directions from the central sealing portion. The first flow control portion is arranged on one side of the axis of rotation of the valve element and the second flow control portion is arranged on an opposite side of the axis of rotation of the valve element. The first and second flow control portions oppose the valve seat sealing surface as the valve element rotates from its closed position. At least one of the first and second flow control portions has a plurality of flow control openings formed therethrough which allow fluid to flow progressively through the flow control portions as the valve element opens or closes.

In certain embodiments, both the first and second flow control portions are provided with the flow control openings. In other embodiments, however, only one of them may be provided with the flow control openings.

The first and second flow control portions may be are formed as respective segment shapes projecting from opposed upper and lower surfaces of the central portion, each flow control portion having an outer surface which faces the sealing surface of the valve seat and which curves inwardly away from the periphery of the central portion and an inner surface which faces away from the sealing surface of the valve seat, the flow control openings extending between the inner and outer surfaces.

The flow control openings may be discrete openings formed through the flow control portions. In alternative embodiments, however, the flow control portion(s) may be formed as porous bodies to define the openings.

In some embodiments, the cross sectional area of the flow control openings decreases from the inner surface of the flow control portion to the outer surface of the flow control portion or vice versa.

In other embodiments, the cross sectional area of a flow control opening may decrease from the inner surface of the flow control portion to a minimum area and then increase towards the outer surface of the flow control portion.

The flow control openings may, in certain embodiments be provided in a series of parallel rows. The rows may be straight or curved.

The respective flow control openings may increase in total cross sectional area with distance away from the central portion.

The flow control openings may extend in a direction generally parallel to the major axis of the elliptical valve opening.

The flow control portions may be formed as separate elements from the central portion and suitably attached thereto. The flow control portions may be additively manufactured. Alternatively, the valve element may be constructed as a one piece element, for example by additive manufacturing.

In embodiments, the valve seat is formed separately from a valve housing and suitably mounted thereto.

The sealing surface of the valve seat may be formed as a layer on the valve seat, for example by additive manufacturing.

The sealing surfaces of the valve seat and the valve element may be metallic, and the sealing surfaces of said valve seat and said valve element may be ground surfaces.

The axis of rotation of the valve element may be aligned with the minor axis of the elliptical valve opening and displaced above the central section of the valve element.

Also disclosed herein is a method of manufacturing the valve element of a valve as discussed above, comprising manufacturing the first and second control portions using an additive manufacturing process, either integrally with the central sealing portion, or separately therefrom and attached thereto

DETAILED DESCRIPTION

Figure 1:
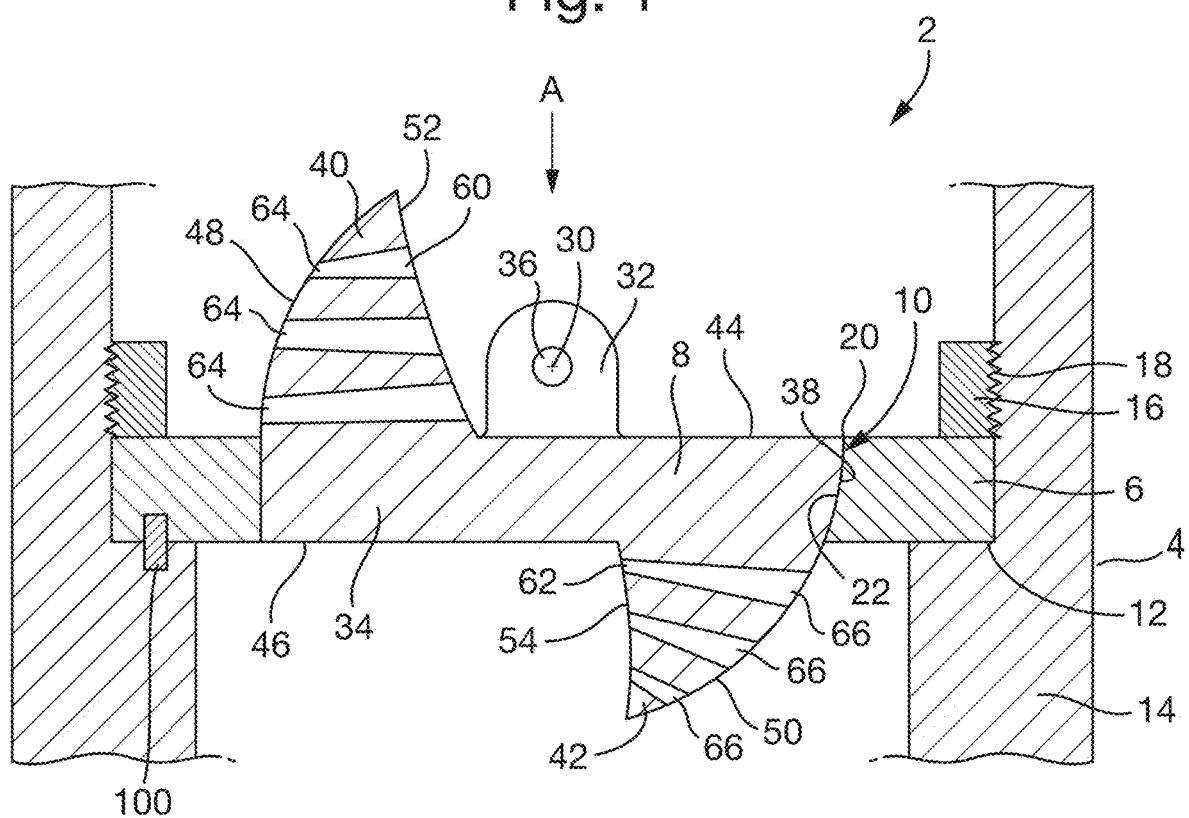
FIG. 1 shows a cross-sectional view of a valve in accordance with the disclosure.

Referring to FIG. 1, a valve 2 is arranged in a housing 4, for example a duct through which, in use, a fluid flows in the direction of arrow A. The duct 4 may be elliptical or circular in cross-sectional although it may be of any desired cross-sectional shape. The housing 4 may be formed as a part of the duct or be adapted to be attached to the duct by means not shown.

The valve 2 comprises a valve seat 6 and a rotary valve element 8 which selectively opens and closes a valve opening 10 formed in the valve seat 6.

In this embodiment, the valve seat 6 is received on a shoulder 12 formed in the wall 14 of the housing 4. In this embodiment, the valve seat 6 is retained in position on the shoulder 12 by means of a nut 16 which threadedly engages an internally threaded portion 18 of the housing wall 14.

Where the duct 4 is circular for example, the valve seat 6 is mounted in the correct rotational orientation by means of a locating pin 100 received in respective bores in the shoulder 12 and valve seat respectively.

The valve seat 6 may be formed from a metallic material, for example steel, although other materials may be used in appropriate circumstances. Forming the valve seat 6 separately from the housing wall 14 may be advantageous in certain embodiments as it may facilitate machining and finishing of the valve seat 6. For example the sealing surface 28 at least of the valve seat 6 may require hardening, e.g. nitride hardening, and/or grinding. In other embodiments, however, the valve seat 6 may be integrally formed with the housing wall 14.

In yet further embodiments, the valve seat 6 can be made as a composite component. For example, the sealing surface 28 may be deposited onto a precursor valve seat body by a suitable technique, for example added manufacturing, to provide a sealing surface 28 with potentially different properties, for example hardness, from the remainder of the valve seat 6.

Figure 2:
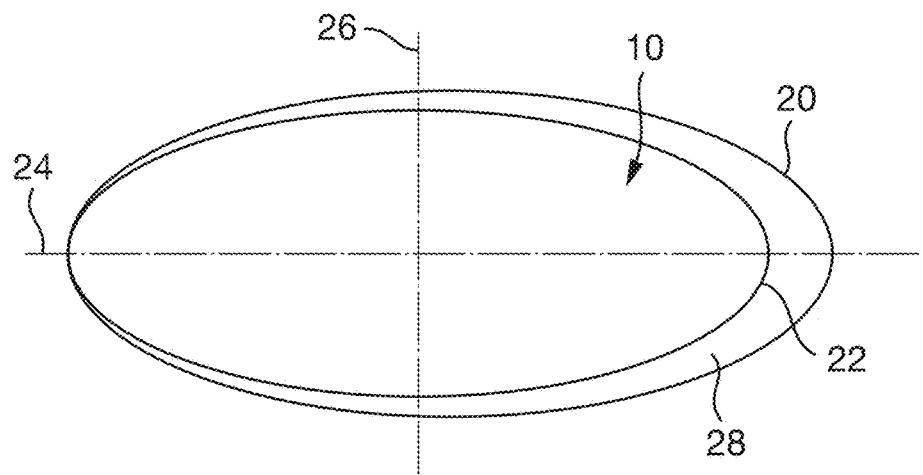
FIG. 2 shows a view of the valve opening of the valve of FIG. 1 along the direction of arrow A.
Figure 3:
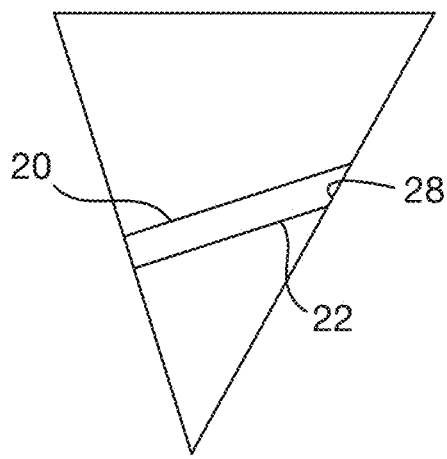
FIG. 3 illustrates the derivation of the shape of the valve opening.

As can be seen from FIG. 2, the valve opening 10 is elliptical in shape. It has spaced apart upper and lower elliptical edges 20, 22 defined on opposed sides of the valve opening 10. The edges 20, 22 are generated as respective ellipses formed by parallel sections through a conical surface. This is illustrated in FIG. 3. The valve opening therefore has a major axis 24 and a minor axis 26 as shown. The upper and lower edges 20, 22 are joined by a sealing surface 28.

The rotary valve element 8 is pivotally mounted about a rotational axis 30 which is aligned with the minor axis 26 of the valve opening 10. The rotational axis 30 is formed in a lug 32 which projects from a central sealing portion 34 of the valve element 8. A drive element (not shown) engages an opening 36 in the lug 32 for rotating the valve element 8. The drive element and opening 36 may be splined or have some other coupling to transmit rotation to the valve element 8.

In certain embodiments, the drive element may be a drive shaft which extends through a wall of the duct 4 for rotation by means of an external drive, such as a gear drive. In other embodiments, the drive element may not extend through the wall of the duct 4, and a contactless drive, for example a magnetic drive coupling, may be provided between the drive element and an external drive. Such an arrangement may be useful when the duct 4 carries corrosive or other potentially hazardous fluids.

The rotary valve element 8 comprises a central portion 34 which has a peripheral sealing surface 38 which is complementary in shape to the sealing surface 28 of the valve seat 6 for engagement therewith in valve a closed position. The valve element 8 effectively forms a plug within the valve opening 10 when the valve is closed (as illustrated in FIG. 1).

The valve element 8 further comprises first and second flow control portions 40, 42 which extend in opposite axial directions from the central portion 34. The first flow control portion 40 is arranged on one side of the rotational axis 30 of the valve element 8 and the second flow control portion 42 is arranged on an opposite side of the rotational axis 30 of the valve element 8.

As can be seen from FIGS. 4 to 7, the first and second flow control portions 40, 42 are formed as respective segment shapes projecting axially from the periphery of opposed surfaces 44, 46 of the central portion 34. Each segment has an outer surface 48, 50 which faces the sealing surface 28 of the valve opening 10 and which curves inwardly away from the periphery of the central portion 34. The outer surfaces 48, 50 may be flush with the peripheral sealing surface 38 of the central sealing portion 34 or slightly offset therefrom for example up to 0.5 mm, for example 0.1 to 0.3 mm. Each segment also comprises an inner surface 52, 54 which faces away from the sealing surface 28 of the valve opening 10. The inner surfaces 52, 54 may be concavely curved as illustrated, convexly curved or planar.

The shapes of the outer surfaces 48, 50 of the flow control portions 40, 42 are such that the valve element 8 will be able to rotate through the valve opening 10.

As can be seen from FIGS. 2 and 4 to 8, a plurality of flow control openings 60, 62 formed through the first and second control portions 40, 42 from the respective inner surfaces 52, 54 to the respective outer surfaces 48, 50. As will be explained further below, these flow control openings 60, 62 will allow fluid to flow progressively through the flow control portions 40, 42 as the valve 2 is opened and closed.

The total cross sectional area of the flow control openings 60, 62 may vary, for example increase, with increasing distance from the central portion.

In this embodiment, the flow control openings 60, 62 are arranged in rows 64, 66 arranged generally parallel to the plane of the upper surface 44 of the central portion 34 of the valve element 8. Of course other arrangements, for example curved rows of flow control openings, or non-parallel rows of flow control openings may be envisaged within the scope of the disclosure.

In yet further embodiments, rather than providing discrete flow control openings, the flow control openings may be provided by means of a porous region or regions of the flow control portions 40, 42. Such regions may be relatively easily provided using additive manufacturing techniques for example. The porosity of the flow control portions 40, 42 may be varied as required.

Figure 8A:
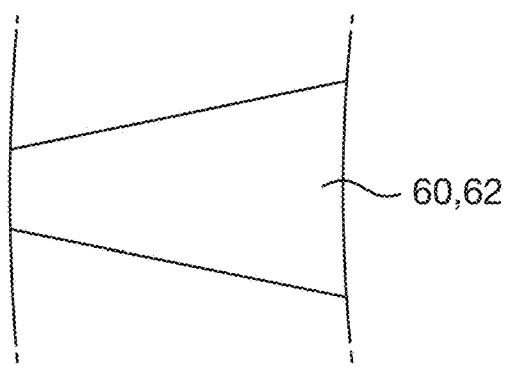
FIGS. 8A and 8B illustrate exemplary shapes of flow control openings.

The cross-sectional area of the flow control openings 60, 62 may vary from the inner surfaces 52, 54 to the outer surfaces 48, 50. For example, the flow control openings 60, 62 may taper from one surface to the other so as to, for example, have a generally frusto-conical shape. Such an arrangement is illustrated in FIG. 1 and FIG. 8A. In the embodiment illustrated, the flow control openings 60, 62 have a larger cross-sectional area at the inner surfaces 52,

54. However, in other embodiments, the cross-sectional area may be greater at the outer surfaces 48, 50.

Figure 8B:
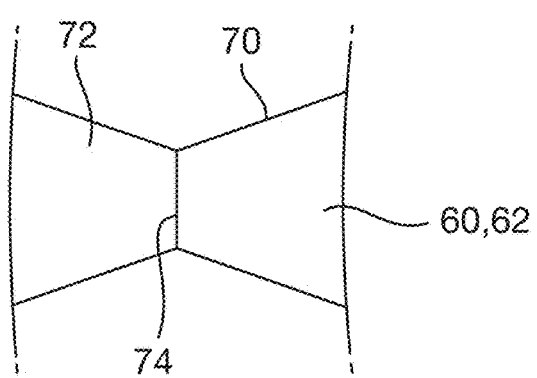

In a yet further embodiment, illustrated in FIG. 8B, flow control openings 60, 62 may have converging conical portions 70, 72, with a minimum flow area 74 defined therebetween. The minimum flow area 74 may be defined as a throat, as illustrated, or as an elongated passage. This arrangement may be advantageous in that it may provide uniformity of flow through the flow control passages 60, 62 during both opening and closing of the valve 2.

The flow control openings 60, 62 may have a circular cross-section, as shown, or some other shape, for example a flattened, race-track shape.

The flow control openings 60, 62 may extend in a direction generally parallel to the major axis 24 of the valve opening 10 and valve element 8. This may have the advantage that the flow control openings 60, 62 may align with the flow direction when the valve is fully opened. However other arrangements, for example transversely angled flow control openings may also be envisaged within the scope of the disclosure.

In the embodiment shown, the flow control portions 40, 42 of the valve element 8 are formed integrally with the central portion 34 thereof. Such a valve element 8 may conveniently be manufactured using additive manufacturing techniques for example. In other embodiments, however, the flow control portions 40, 42 are formed separately from the central portion 34 and suitably attached thereto. For example, the flow control portions 40, 42 may be formed by an additive manufacturing technique and then attached, for example brazed or mechanically fastened, to the central portion 34.

The central portion 34 at least of the valve element 8 may be made from a metallic material. The sealing surface 38 of the central portion may be hardened, for example nitride hardened, and may be ground to ensure a good seal with the valve seat sealing surface 28.

Having described the structure of the valve, its operation will now be described with reference to FIGS. 4 to 6.

Figure 4:
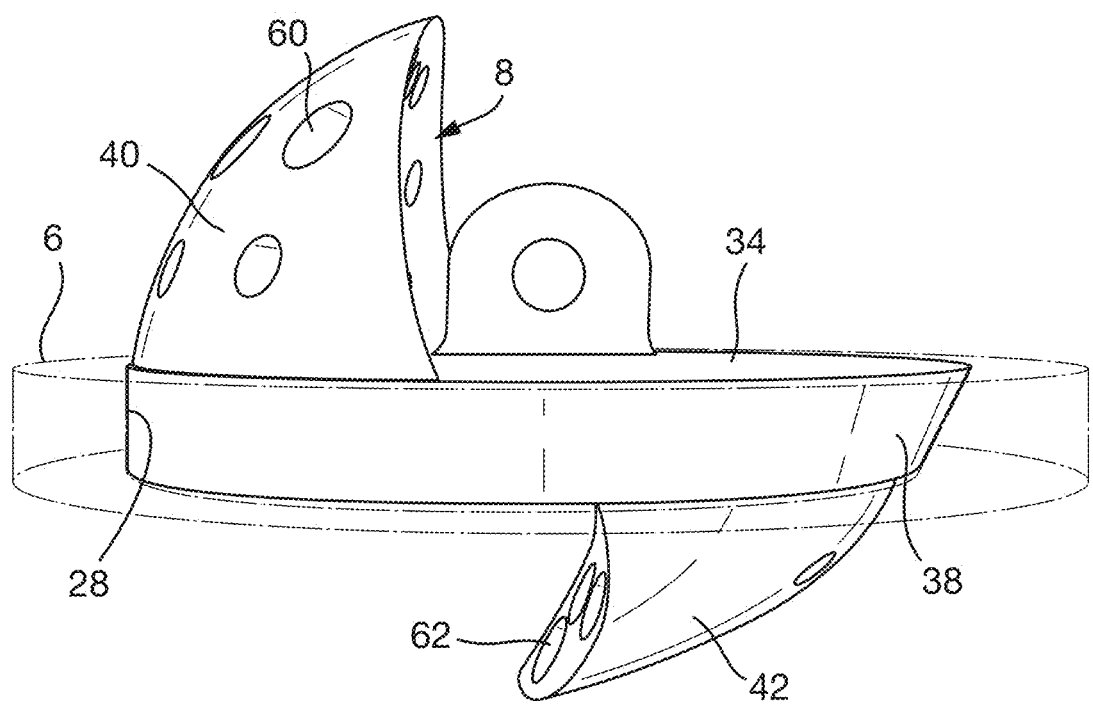
FIG. 4 shows a perspective view of a valve in accordance with the disclosure, with the valve opening shown in phantom for clarity, in a closed position.

Referring firstly to FIG. 4, it will be seen that the valve element 8 is in a closed position in which the sealing surface 38 of the central portion 34 of the valve element is in sealing engagement with the sealing surface 28 of the valve seat 6. No flow is therefore possible through the valve opening 10.

Figure 5:
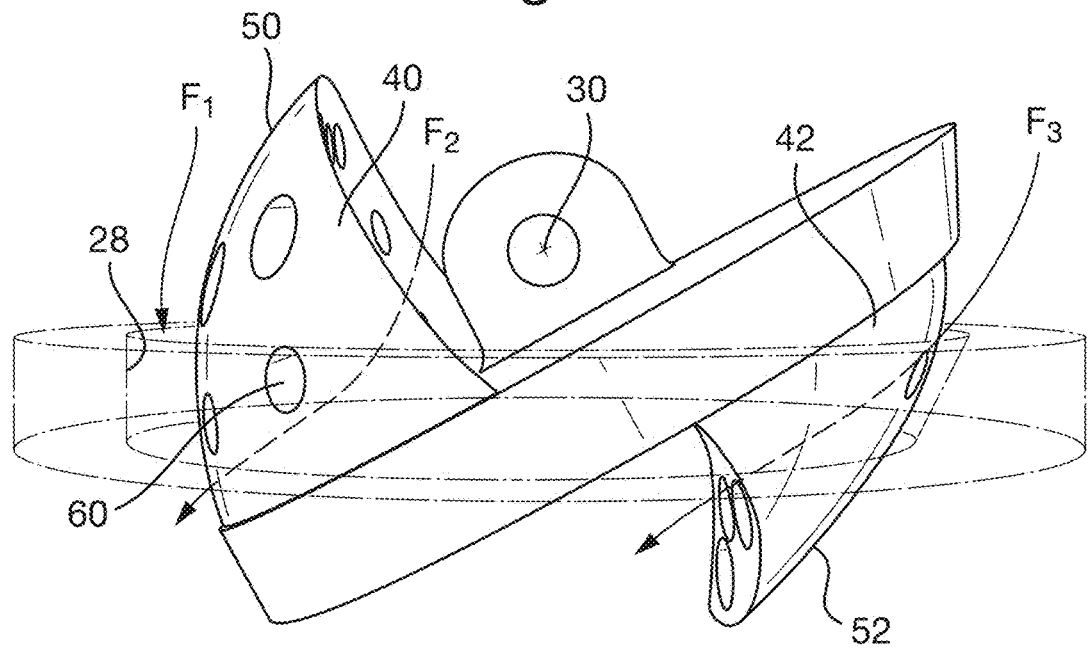
FIG. 5 shows the valve of FIG. 4, with the valve in a partially opened position.

FIG. 5 shows the valve element 8 in a partially opened position. In this position, the valve element has been rotated about the axis 30 such that the sealing surface 38 of the central portion 34 of the valve element 8 moves out of sealing engagement with the sealing surface 28 of the valve seat. A number of flow paths are created around and through the valve element 8. A flow path F1 is defined between the outer surfaces 50, 52 of the flow control portions 40, 42 of the valve element 8 and the sealing surface 28 of the valve seat 6. Were the valve element 8 to be formed as a simple plate, there would potentially be a large initial flow through flow path F1 around the valve element 8. This may lead to a water hammer effect. However, the flow control portions 40, 42, reduce this effect. It will be seen that the flow control portions 40, 42 block a significant amount of flow around the periphery of the central portion 34 of the valve element 8. However, a limited amount of flow F2 is possible through the first flow control portion 40 via the flow control openings 60. Similarly, a limited amount of flow F3 is possible through the second flow control portion 42 by the flow control openings 62. It will be understood that as the valve element 8 rotates, more flow control openings 60, 62 will allow flow through the valve element from one side of the valve to the other. This progressive increase in effective flow area through the valve 2 reduces the water hammer effect.

Figure 6:
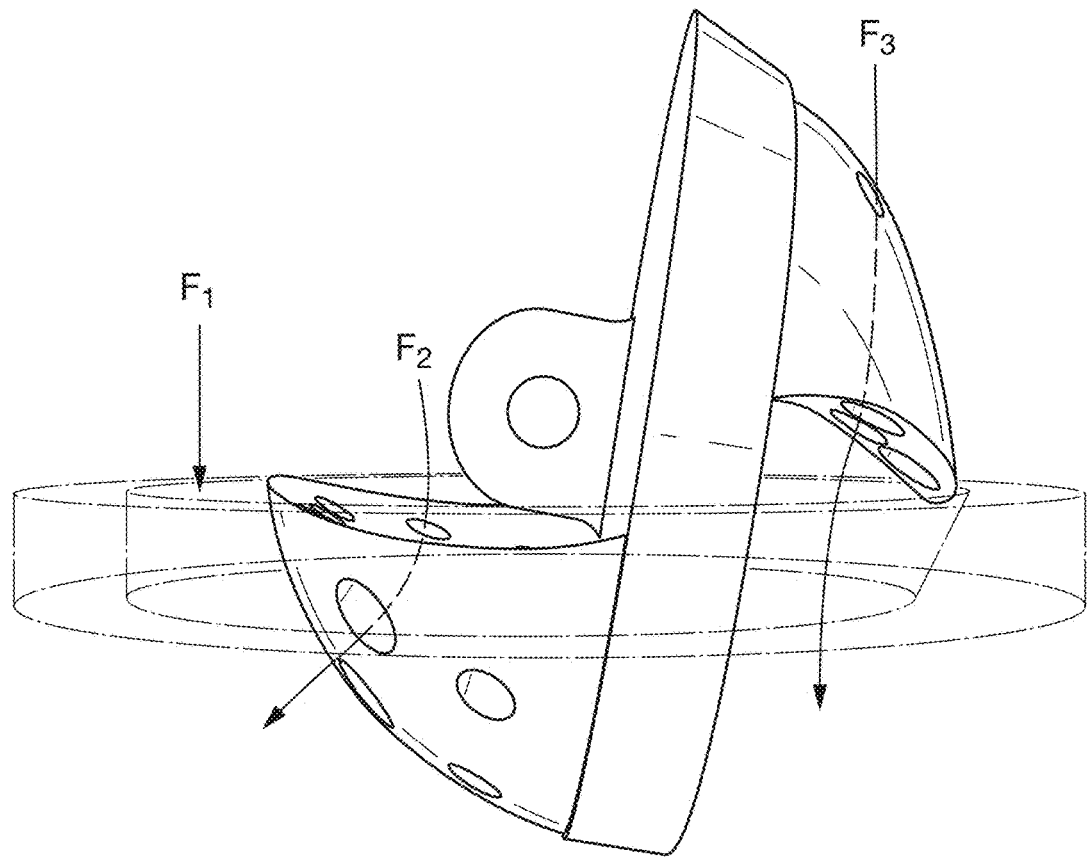
FIG. 6 shows the valve of FIG. 4, with the valve in a fully opened position.
Figure 7:
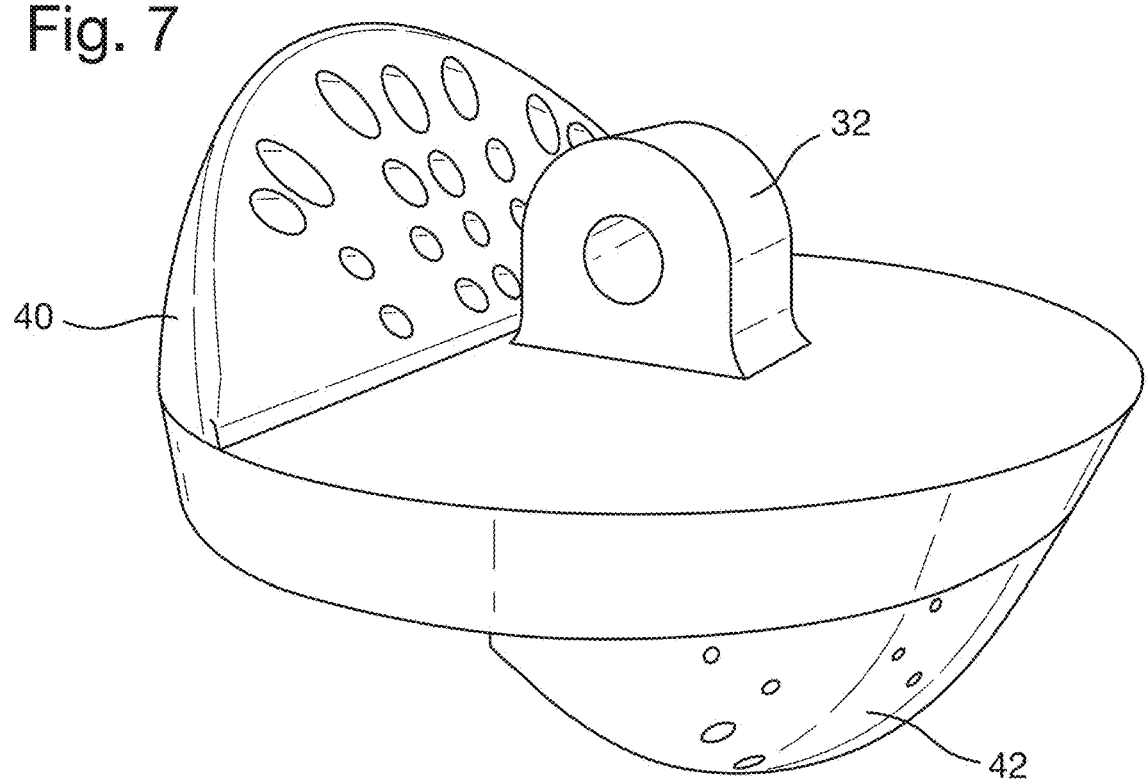
FIG. 7 shows a perspective view of the valve element of the valve in FIGS. 4 to 6.

FIG. 6 shows the valve element in a fully open position. The flow control openings 60, 62 all permit flow through the valve element 8 via flowpath F2 and F3. The flow rate through the valve may therefore be high and the resistance to flow through the valve 2 be relatively low as there is a large open area defined.

It will be understood that a similar water hammer effect may occur during closure of the valve element 8. The flow control openings 60, 62 may mitigate this effect also due to the progressive reduction of the flow area.

The particular shape and arrangement of the flow control openings 60, 62 may be chosen to provide suitable flow characteristics. For example, as discussed above, the flow control openings 60, 62 may have a double conical shape which may provide similar characteristics during valve opening and valve closing.

Also, the shape of the flow control portions 40, 42 of the valve element 8 may differ from that shown. For example, they may be relatively thinner than illustrated with the inner and outer surfaces thereof arranged more closely together, whereby the flow control portions 40, 42 may resemble a shell segment.

The embodiments of the disclosure may be advantageous in reducing the effect of water hammer in a fluid flow valve, thereby potentially increasing the life of the valve.

It will be seen that in the embodiment described above, both the flow control portions 40, 42 are provided with flow control openings 60, 66. However, in other embodiments, only one of the flow control portions 40, 42 may be provided with flow control openings 60, 66. The other flow control portions 40, 42 would be essentially solid and non-permeable. Such an arrangement may not be as advantageous as the embodiment described above, as it may potentially restrict the flow of fluid through the valve.

The invention claimed is:

1. A valve comprising:
a valve seat comprising a valve opening and a sealing surface defined around said valve opening;
a valve element mounted with respect to said valve seat for rotation about an axis of rotation between a closed position in which the valve element substantially closes the valve opening and an open position in which the valve element permits flow through the valve opening;
wherein said valve opening is elliptical in shape, having spaced apart upper and lower edges the upper and lower edges being generated as respective ellipses formed by parallel sections through a conical surface, the valve seat sealing surface being defined between said upper and lower edges;
wherein said valve element comprises a central sealing portion having a peripheral sealing surface which is complementary in shape to the sealing surface of the valve seat for engagement therewith in the closed position and first and second flow control portions extending in axially opposite directions from said central portion, said first flow control portion being arranged on one side of the axis of rotation of the valve element and said second flow control portion being arranged on an opposite side of the axis of rotation of the valve element, said first and second flow control portions opposing said valve seat sealing surface as said valve element rotates from its closed position; and
at least one of said first and second flow control portions having a plurality of flow control openings formed therethrough which flow control openings allow fluid to flow progressively through the flow control portions as the valve element opens or closes;

wherein the first and second flow control portions are formed as respective segment shapes projecting from opposed upper and lower surfaces of the central sealing portion, each flow control portion having an outer surface which faces the sealing surface of the valve seat and which curves inwardly away from the periphery of the central portion and an inner surface which faces away from the sealing surface of the valve seat, the flow control openings extending between the inner and outer surfaces; and wherein the cross sectional area of a flow control opening decreases from the inner surface of the flow control portion to a minimum area and then increases towards the outer surface of the flow control portion.

2. A valve as claimed in claim 1, wherein both the first and second flow control portions are provided with the flow control openings.

3. A valve as claimed in claim 1, wherein the flow control openings are discrete openings formed through the flow control portions.

4. A valve as claimed in claim 1, wherein the flow control openings extend in a direction generally parallel to a major axis of the elliptical valve opening.

5. A valve as claimed in claim 1, wherein said flow control portions are separate elements from said central sealing portion and attached thereto, the separate elements optionally being additively manufactured and mounted to the central sealing portion.

6. A valve as claimed in claim 1, wherein said valve element is constructed as a one piece element.

7. A valve as claimed in claim 1, wherein said valve seat is formed separately from a valve housing and mounted thereto.

8. A valve as claimed in claim 1 wherein said sealing surface of said valve seat is formed as a layer on said valve seat.

9. A valve as claimed in claim 1, wherein said sealing surfaces of said valve seat and said valve element are metallic.

10. A valve as claimed in claim 1, wherein said axis of rotation of said valve element is aligned with a minor axis of said elliptical valve opening and displaced above said central section of said valve element.

11. A valve as claimed in claim 6, wherein said valve element is constructed by additive manufacturing.

12. A valve as claimed in claim 8 wherein said sealing surface of said valve seat is formed by additive manufacturing.

13. A valve as claimed in claim 9, wherein said sealing surfaces of said valve seat and said valve element are ground surfaces.

14. A method of manufacturing the valve element of a valve as claimed claim 1, comprising:

manufacturing the first and second control portions using an additive manufacturing process, either integrally with the central sealing portion or separately therefrom and attached thereto.

* * * * *